United States Patent
Cheng et al.

(10) Patent No.: US 7,957,459 B2
(45) Date of Patent: Jun. 7, 2011

(54) SYMBOL RATE TESTING METHOD BASED ON SIGNAL WAVEFORM ANALYSIS

(75) Inventors: Yu-Yi Cheng, Taipei (TW); Kou-Cheng Yeh, Kaohsiung County (TW); Chun-Chen Chen, Hsinchu County (TW); Teng-Chun Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1112 days.

(21) Appl. No.: 11/688,880

(22) Filed: Mar. 21, 2007

(65) Prior Publication Data

US 2008/0159164 A1 Jul. 3, 2008

(30) Foreign Application Priority Data

Dec. 29, 2006 (TW) .............................. 95149972 A

(51) Int. Cl.
  *H04B 3/46* (2006.01)
  *H04B 17/00* (2006.01)
  *H04Q 1/20* (2006.01)
(52) U.S. Cl. ...................................... 375/224
(58) Field of Classification Search ............ 375/224
  See application file for complete search history.

(56) References Cited

U.S. PATENT DOCUMENTS

| 6,377,618 | B1 | 4/2002 | Prasad et al. |
| 2001/0055334 | A1 | 12/2001 | Tiedemann, Jr. et al. |
| 2003/0063583 | A1 | 4/2003 | Padovani et al. |
| 2005/0201491 | A1 * | 9/2005 | Wei .............................. 375/326 |

FOREIGN PATENT DOCUMENTS

TW 00418081 1/2001

* cited by examiner

*Primary Examiner* — David C. Payne
*Assistant Examiner* — Tanmay K Shah
(74) *Attorney, Agent, or Firm* — Jianq Chyun IP Office

(57) ABSTRACT

A symbol rate testing method based on signal waveform analysis is provided. A signal with a plurality of quasi bits 1 and a plurality of quasi bits 0 is received and sampled within an acquiring time. Maximum values of the quasi bits 1 are obtained by calculating sampling values of the signal at various sampling points. A minimum value among the maximum values is determined as a critical value. Whether a quasi bit 1 is a bit 1 or not is determined according to the critical value, and a total number of the bits 1 within the acquiring time is counted. Similarly, a number of the bits 0 within the acquiring time are also obtained. Thus, the symbol rate is obtained according to the above information.

12 Claims, 8 Drawing Sheets

SYMBOL RATE TESTING METHOD BASED ON SIGNAL WAVEFORM ANALYSIS

CROSS-REFERENCE TO RELATED APPLICATION

This application claims the priority benefit of Taiwan application serial no. 95149972, filed Dec. 29, 2006. All disclosure of the Taiwan application is incorporated herein by reference.

BACKGROUND OF THE INVENTION

1. Field of the Invention

The present invention relates to a symbol rate testing method. More particularly, the present invention relates to a symbol rate testing method based on signal waveform analysis.

2. Description of Related Art

When designing a communication system (e.g., a WLAN system), the performance of the communication system must be evaluated to ensure that the design of the communication system complies with international standards. During the testing of the system, the symbol rate is one of the most important testing items.

When a designer finishes the design of a communication system, the system must be subjected to a series of tests and verifications to prove that the designed communication system complies with international standards. Among all relevant system testing items, the testing result of the symbol rate of the communication system modules can be used to evaluate the performance of the system.

Several relevant or similar techniques have been disclosed in the conventional art. For example, US Patent Application No. US20030063583A1 discloses a high data rate transmission method and apparatus. According to this application, a high-speed package transmission apparatus for measuring a data transmission rate of a forward link signal at a mobile station is included in a CDMA system, so as to evaluate the system characteristics. However, according to this method, the value of the signal to noise and interference ratio (C/I) of the forward link signal under measurement can only be obtained through complicated statistical function models.

Moreover, US Patent Application No. US20010055334A1 discloses a method and apparatus for determining data rate by detecting variable rate data through hypothesis testing. This application is a vocoder applicable to CDMA having transmitted data frame with a variable rate. During the design of the vocoder, a receiving terminal dynamically measures a signal transmission rate through hypothesis testing. However, the statistical characteristics of the transmitted signal must be determined precisely in advance when measuring the signal transmission rate with this method.

Moreover, U.S. Pat. No. 6,377,618B1 discloses a system and method of data rate detection. This patent uses statistical characteristics of a series of signal sequences transmitted in a setting time to estimate the transmission rate of the transmitted signals. However, for a certain signal interval, this method utilizes calculated auto-correlation functions to find corresponding critical values, so as to estimate the possible signal transmission rate. Therefore, true signal transmission rate cannot be obtained through this technique.

In addition, ROC Patent No. 00418081 discloses a non-invasion blood oxygen concentration meter, and a method of detecting peak and valley of a waveform signal. This patent uses signal levels representing a dynamic peak threshold value and a dynamic valley threshold value to track the peak and valley of the electric signal respectively, and the signal levels can be adjusted dynamically. When calculating the peak and valley, the dynamic peak threshold value and the dynamic valley threshold value are set to be a rising edge of the peak and a falling edge of the valley respectively, so as to find the new rising edge of the peak and falling edge of the valley and the actual peak and valley according to the dynamic searching. Finally, the time that the rising edge of the peak and the falling edge of the valley sustain is counted, and the values and time points of the peak and the valley are confirmed. This method only provides a method of detecting peak and valley, but cannot recognize characteristics of the signal, so is not applicable to the testing of wireless communication products.

As the existing conventional methods cannot provide simple and effective testing, it has become the trend of this field to find a simple method to test the symbol rate.

SUMMARY OF THE INVENTION

In view of the above problems, the present invention provides a symbol rate testing method based on signal waveform analysis, which does not need a complicated mathematical operation and hardware structure to obtain a testing result of the symbol rate, and meets requirements on the system module testing of a system designer.

The present invention provides a symbol rate testing method based on signal waveform analysis, which includes the following steps. Firstly, a signal with a plurality of quasi bits 1 and a plurality of quasi bits 0 is received and sampled within an acquiring time. Then, maximum values of the quasi bits 1 are obtained by calculating sampling values of the signal at various sampling points. A minimum value among the maximum values is determined as a critical value to determine whether the quasi bits 1 are bits 1 or not. Whether the quasi bits 1 are the bits 1 is determined according to the critical value, and a total number of the bits 1 within the acquiring time is counted. Similarly, the number of bits 0 within the acquiring time can also be counted. The symbol rate can be calculated according to the total number of the bits 1 and the total number of the bits 0, so as to evaluate the performance of a communication system.

Through the above method, the signal can be analyzed and the symbol rate can be tested simply and precisely, so the system testing becomes more accurate.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Before explaining the symbol rate testing method of the present invention, the method of signal waveform analysis will be explained in brief. The basic purpose of the method of waveform analysis is to carry out a simple signal analysis on the signal waveform acquired in a unit time, so as to obtain the testing result of the symbol transmission rate of the communication system under test.

Figure 1:
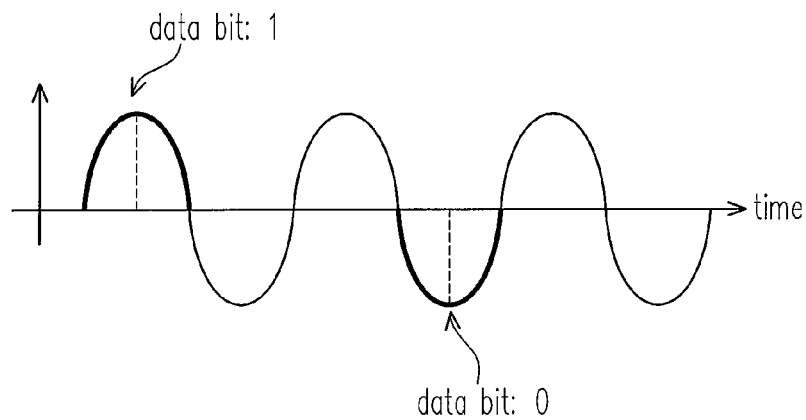
FIG. 1 is a diagram illustrating the bit 1 and bit 0 in the signal waveform.

The signal analysis can achieve following functions. Firstly, for a sinusoidal waveform, the signal can be determined to be a bit 0 or a bit 1, and the definition of the bit 0 or bit 1 is as shown in FIG. 1. The bit 1 refers to the upper part of the sinusoidal wave above the zero point, and can also be referred to an upper sine wave. The bit 0 refers to the lower part of the sinusoidal wave below zero point, and can also be referred to a lower sine wave. In consideration of an imperfect sinusoidal waveform that is subject to noises or obtained after signal demodulation, the method of this embodiment can determine the attributes of the signal information. Moreover, by analyzing the signal of the acquired waveform, the symbol transmission amount of the communication system under test in a unit time of the acquired signal can be obtained, so as to calculate the symbol transmission rate of the communication system under test.

The method of this embodiment will be described below in detail.

Figure 2A:
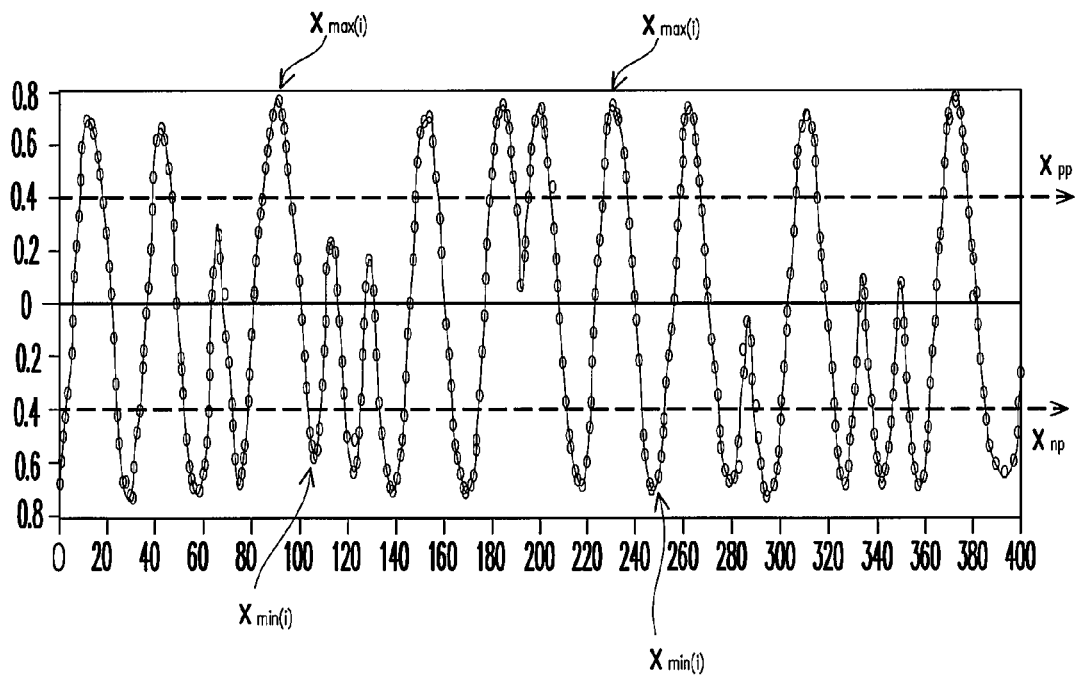
FIG. 2A shows a signal waveform within a time interval, for illustrating the definitions of the parameters used in the present invention.

Definitions of parameters used in the method of this embodiment are explained. FIG. 2A shows a signal waveform within a time interval for explaining the definitions of the parameters used in the present invention. By using these parameters, the signal waveform can be determined to be bit 1 or bit 0.

Parameter T is defined as the number of possible signal sampling points of one bit. Generally, the signal sampling points of every bit are the same. However, during the signal transmission, the frequency often changes slightly. Therefore, when the system acquires a signal, the number of the signal sampling points of each bit will be set first. In order to analyze and process a signal whose frequency is slightly changed, it is assumed that T is the number of possible signal sampling points of one bit. To make the waveform analysis more precise and reliable, the sampling points of one bit can be set to at least 10.

Parameter $x_{pp}$. In consideration of a series of sinusoidal waves, if the sinusoidal wave has N bits 1 (upper sine waves), the maximum values $x_{max}(i)$ of the bits 1 can be obtained from the waveform, where i=1, . . . , N. Then, as for the obtained maximum values of the bits 1, a minimum value $x_{pp}$ in a set of these maximum values is determined, which is expressed by the following mathematical expression (1):

$$x_{pp} = \underset{min}{arg} x_{max}(i) \quad (1)$$
$$i = 1, \ldots, N$$

Parameter $x_{np}$. In consideration of a series of sinusoidal waves, if the sine wave has N bits 0 (lower sine waves), the minimum values $x_{min}(i)$ of the bits 0 can be obtained from the waveform, where i=1, . . . , N. Then, as for the obtained minimum values of the bits 0, a maximum value $x_{np}$ in a set of these minimum values is determined, which is expressed as the following mathematical expression (2):

$$x_{np} = \underset{max}{arg} x_{min}(i) \quad (2)$$
$$i = 1 \ldots N$$

The parameters $x_{pp}$ and $x_{np}$ are comprehensible with reference to dash lines marked in FIG. 2A. The parameter $x_{pp}$ is equal to a critical (determination) value, and when one sampled value in a signal bit is greater than the parameter $x_{pp}$, the signal bit is determined as a bit 1. On the contrary, the parameter $x_{np}$ is also a critical (determination) value, and when one sampled value in a signal bit is smaller than the parameter $x_{np}$, the signal bit is determined as a bit 0. Further details will be illustrated below.

Parameter C is defined as the actual number of sampling points. As described above, the signal frequency varies during the transmission, so the sampling points of various bits may be different. Therefore, the parameter C is assumed to be the actual signal sampling points of each bit.

Parameter x(t) is defined as a value of the sampled signal at time t. Moreover, parameters of $m_n$, $m_o$, and s can be further defined according to the parameter x(t), which are respectively expressed as the following expressions (4) and (5):

$$\Delta t = t_1 - t_2, t_1 > t_2 \quad (3)$$

$$m_n = \frac{x(t) - x(t-1)}{\Delta t} \quad (4)$$

$$m_o = \frac{x(t-1) - x(t-2)}{\Delta t} \quad (5)$$

Figure 2B:
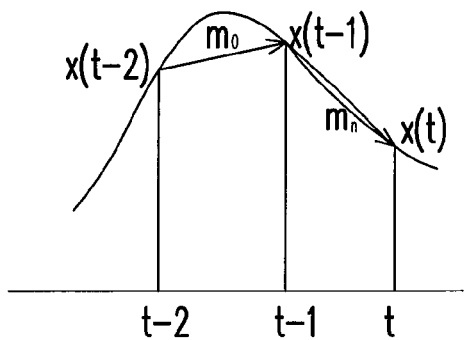
FIG. 2B is a diagram illustrating the parameters $m_n$ and $m_o$.

Taking FIG. 2B as an example, the parameters $m_n$ and $m_o$ are mainly used to determine the state varied between two sampled values. The parameter $m_n$ shows the state variation of the sampled values x(t) and x(t−1) at two sampling points within the time interval $t_1$ to $t_2$. As shown in FIG. 2B, the parameter $m_n$ indicates a state that the sampled value decreases with time. The parameter $m_o$ shows the state variation of the sampled values x(t−1) and x(t−2) at two sampling points within the time interval $t_1$ to $t_2$. As shown in FIG. 2B, the parameter $m_o$ indicates a state that the sampled value increases with time.

In addition, a parameter s can further be defined by $m_n$ and $m_o$. The value of the parameter s is 0 or 1, representing the variation among three sampled values. To illustrate with the parameters $m_n$ and $m_o$, when the parameters $m_n$ and $m_o$ are positive values, it indicates that the sampled value increases with time. When the parameters $m_n$ and $m_o$ are negative values, it indicates that the sampled value decreases with time. Therefore, when the parameters $m_n$ and $m_o$ change from positive value to negative value (+→−), the parameter s is defined to be 0; otherwise, the parameter s is defined to be 1. In other words, the state variation of x(t), x(t−1), $m_n$, and $m_o$ are recorded by the parameter s with 0 and 1.

Figure 3:
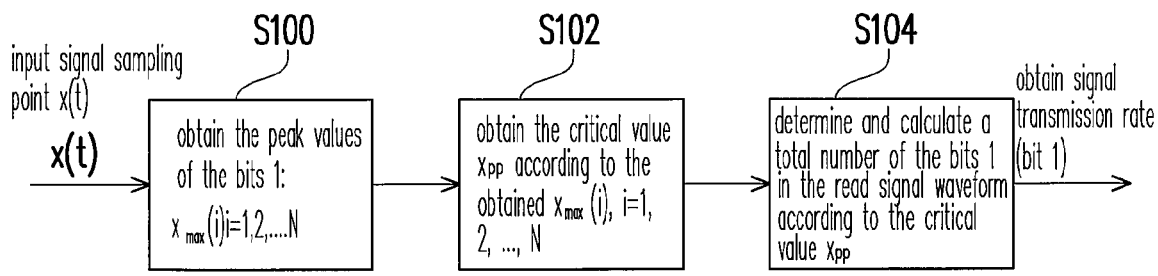
FIG. 3 is a schematic flow chart of the symbol rate testing method according to one embodiment of the invention.

Then, the algorithm and the symbol rate testing method of the present invention are illustrated in detail with the parameters defined above. FIG. 3 is a schematic flow chart of the symbol rate testing method of this embodiment. Here, FIG. 3 takes the bit 1 as an example to explain the embodiment, and definitely, these steps can also be modified correspondingly for the bit 0.

As shown in FIG. 3, firstly, in step S100, the sampled values x(t) of the signal at various sampling points are read. The signal is basically a waveform similar to a sinusoidal wave, and has a plurality of peaks and valleys which represent the quasi bits 1 and the quasi bits 0. Here, the quasi bits 1 or the quasi bits 0 refer to that the waveform may be bits 1 or bits 0. The peak values of the quasi bits 1 are calculated according to the sampled values x(t), i.e., the maximum values $x_{max}(i)$.

In step S102, the critical value $x_{pp}$ is calculated according to the peak values $x_{max}(i)$ that are possibly bits 1, and the minimum value is obtained among the peak values $x_{max}(i)$ that are possibly bits 1.

Then, in step S104, the number of the bits 1 is determined and calculated according to the critical value $x_{pp}$ obtained in step S102. After that, the bit rate is calculated according to the obtained number Q of the bits 1, i.e., $Q/T_S$ ($T_S$ is an acquiring time for sampling values). Next, the symbol rate is calculated according to the obtained bit rate, so as to evaluate the performance of the communication system.

Figure 4A:
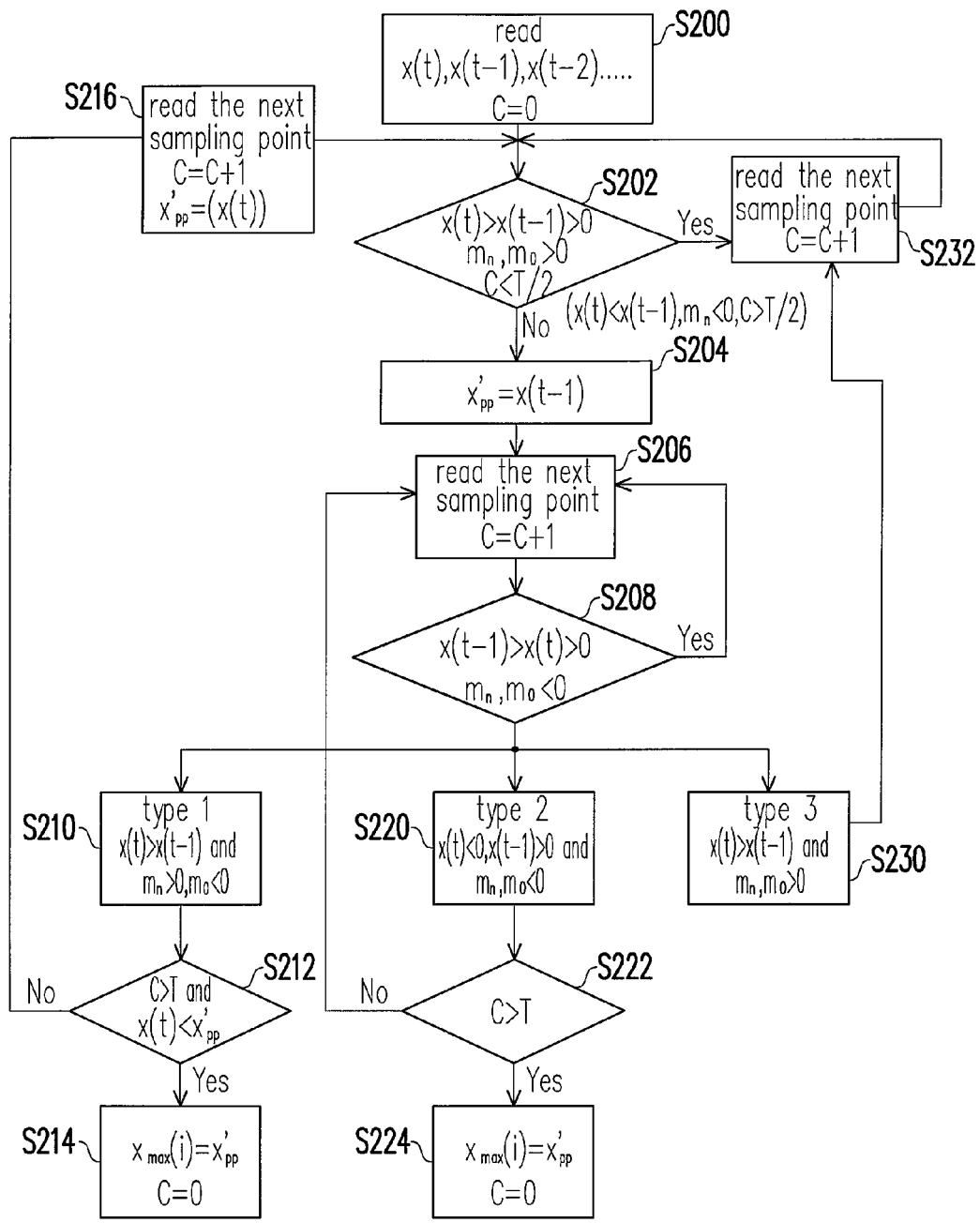
FIG. 4A is a schematic flow chart of the calculation of the peak values of the bits.
Figure 5A:
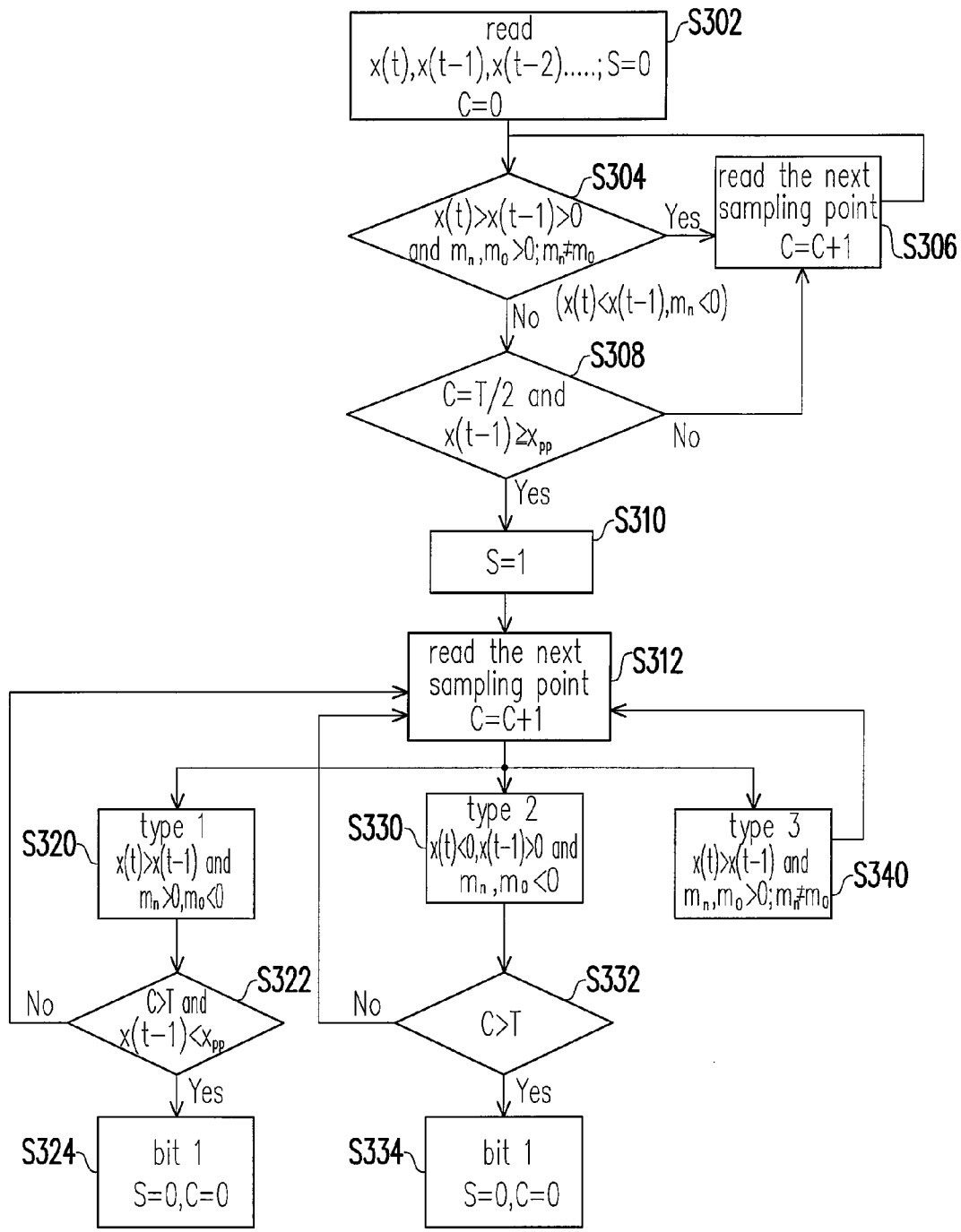
FIG. 5A is a schematic flow chart of determining whether the waveform is the bits 1.

Then, the steps of FIG. 3 are illustrated below in detail. Two important steps in FIG. 3 include calculating the peak values of the quasi bits 1 and determining whether the quasi bits 1 are the bits 1. The following description is illustrated with reference to FIGS. 4A and 5A, in which FIG. 4A is a schematic flow chart of calculating the peak values of the bits, and FIG. 5A is a schematic flow chart of determining whether the quasi bits 1 are the bits 1.

Figure 4B:
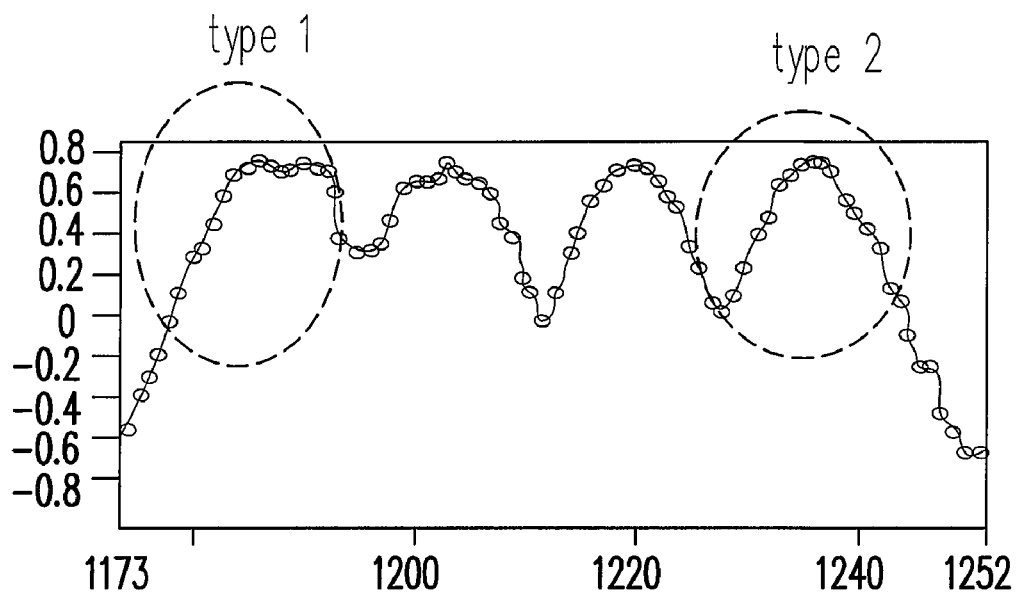
FIG. 4B shows examples of typical types of the bit 1.

Firstly, the determination and the calculating processes of the maximum (peak) values of the sampled values of the quasi bits 1 are illustrated first. Taking the waveform of the bits 1 for example, it is substantially classified into three types, and FIG. 4B shows examples of type 1 and type 2. As shown in FIG. 4A, firstly, in step S200, a currently sampled value, a previously sampled value, and a second previously sampled value of the quasi bits 1 are read, i.e., the sampled values x(t), x(t−1), and x(t−2) are obtained. At this time, the sampling point C=0 (the definition of C is as described above). It should be made clear first that the sampled values x(t), x(t−1), and x(t−2) are not fixed values. The sampled value x(t) refers to the currently sampled value of the current sampling, and x(t−1) and x(t−2) stand for the sampled values of the previously and the second previously sampled points respectively. The meaning of x(t), x(t−1), and x(t−2) will be the same in the following description.

Then, in step S202, it is determined whether the currently sampled value is greater than the previously sampled value, whether the second previously sampled value, the previously sampled value, and the currently sampled value are in an increasing state, and whether the current number of the sampling points is enough. In other words, in step S202, it is determined whether x(t) is greater than x(t−1), whether $m_o$ and $m_n$ are greater than 0, and whether C is greater than T/2. Whether x(t) is greater than x(t−1) or not is determined for the determination of whether the sampled value is greater than the previously sampled value or not. Whether $m_o$ and $m_n$ are greater than 0 or not is determined for whether the sampled values are still ascending. Whether C is greater than T/2 is determined for whether the sampling points exceed half of the predetermined sampling points. If the sampling points do not reach half of the predetermined sampling points, the high values obtained are not the maximum values. Therefore, adding the determination condition of C>T/2 is to guarantee that there are enough samples provided for determination. When the three conditions of step S202 are satisfied, it is indicated that the sampled values are increased continuously, but the samples of the sampling points are not enough. Therefore, step 232 is performed subsequently, i.e., continue to sample and compare the sampled values.

On the contrary, when the conditions of step S202 are not satisfied, step 204 is performed. In step S204, at this time, the sampling points exceed half of the predetermined sampling points. At this time, x(t−1) is a relatively high sampling point and x(t) is a relatively low sampling point. Therefore, the temporary maximum value $x'_{pp}$ is set to be x(t−1). After that, in step S206, the sampled value of the next sampling point (C=C+1) is read.

Then, in step S208, it is determined whether the next sampled value (the new currently sampled value) is smaller than the previously sampled value, and whether the second previously, the previously, and the next sampled values are in a decreasing state. In other words, in step S208, it is determined whether x(t−1) is greater than x(t), and whether $m_o$ and $m_n$ are smaller than 0. In step S208, the sampling points basically exceed half of the predetermined number, so subsequently it is determined whether or not the relatively high value determined at the previous step is the maximum value. The maximum value is characterized in that the previously sampled value is greater than the latter sampled value, and the sampled values decrease with time. Therefore, in step S208, it is determined whether the previously sampled value x(t−1) is greater than the currently sampled value x(t), and whether $m_o$ and $m_n$ are both smaller than 0, so as to determine whether or not the sampled values are decreased continuously. In addition, in order to determine whether x(t) is greater than 0, it must be judged whether the sampled value of this quasi bit 1 falls within the range of the quasi bit 0. When all conditions of step S208 are satisfied, return to step S206, and continue to read the sampled value of the next sampling point.

When the conditions of step S208 are not satisfied, the determination will be made according to several types. Here, several typical types of the bits 1 will be illustrated with reference to FIGS. 4C, 4D, and 4E.

Figure 4C:
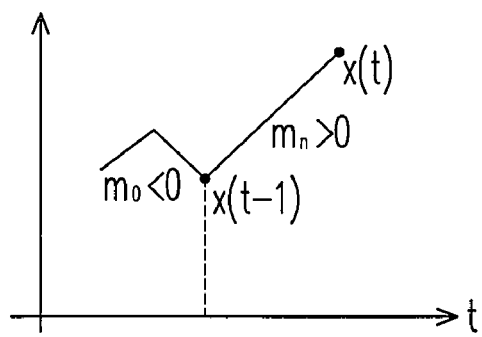
FIGS. 4C, 4D, and 4E are supplementary diagrams for illustrating FIG. 4A.

Firstly, referring to FIG. 4C and step S210, it is indicated that the next sampled value (the new currently sampled value) is greater than the previously sampled value, the second previously and the previously sampled values are in a decreasing state, and the previously sampled value and the next sampled value (the new currently sampled value) are in an increasing state. In other words, the currently sampled value x(t) is greater than the previously sampled value x(t−1), $m_o$ is smaller than 0, and $m_n$ is greater than 0. In this situation, it is indicated that the preset maximum value $x'_{pp}$ may be not the true maximum value. Therefore, the determination must be made under the conditions of step S212. In step 212, it is determined whether the number C of the sampling points is greater than the predetermined number T of the sampling points, and whether the sampled values x(t) are smaller than $x'_{pp}$. If yes, the maximum sampled value $x_{max}(i)$ of the $i^{th}$ quasi bit 1 is set to be $x'_{pp}$, and the number C of the sampling points is reset to be 0, i.e., the maximum sampled value of the next quasi bit 1 is recalculated.

The determination principle of step S212 is for determining whether the sampling at all sampling points of the quasi bit 1 have been completed. If the sampling at all sampling points has been completed, and the sampled values do not exceed the predetermined value $x'_{pp}$, it is determined that the maximum sampled value of the bit 1 is $x'_{pp}$.

On the contrary, if the conditions of step S212 are not satisfied, i.e., the sampling at all the sampling points for the quasi bit 1 has not been completed, and the currently sampled value is greater than the predetermined value $x'_{pp}$, then perform step S216, and set the maximum value as the currently sampled value x(t) and read the sampled value of the next sampling point. Then, return to step S202.

Figure 4D:
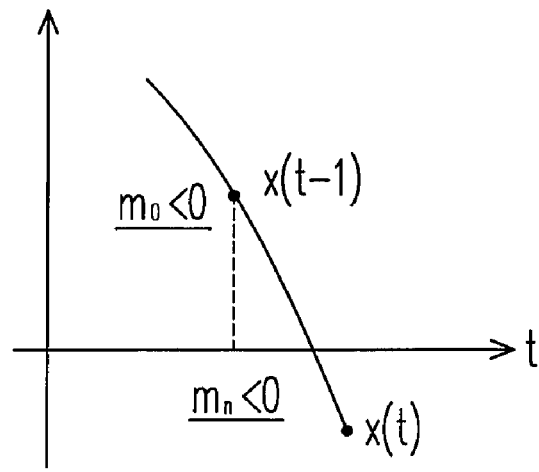

Type 2 will be discussed below. Referring to FIG. 4D, in the type 2, the next sampled value (the new currently sampled value) is smaller than 0, the previously sampled value is greater than 0, and the second previously, the previously, and the next sampled values (the new currently sampled value) are in a decreasing state. In other words, the currently sampled value x(t) is smaller than 0, the previously sampled value x(t−1) is greater than 0, and $m_o$ and $m_n$ are both smaller than 0. Referring to FIG. 4D, the currently sampled value x(t) is smaller than 0, so it possibly falls within the range of the quasi bit 0. In addition, the condition that $m_o$ and $m_n$ are both smaller than 0 indicates that the sampled values are decreased continuously. Then, in step S222, it is determined whether the number C of the sampling points is greater than the predetermined number T of the sampling points. If the condition of step S222 is satisfied, it indicates that the sampling at all the sampling points of the quasi bit 1 has been completed, and the sampled values do not exceed the predetermined value $x'_{pp}$. Thus, it can be determined that the maximum sampled value of the bit 1 is $x'_{pp}$, i.e., the maximum sampled value $x_{max}(i)$ of the $i^{th}$ quasi bit 1 is set to be $x'_{pp}$. In addition, the number C of the sampling points is reset to be 0, i.e., the maximum sampled value of the next quasi bit 1 will be recalculated.

On the contrary, if the condition of step S222 is not satisfied, i.e., the sampling at all the sampling points has been completed. Therefore, the currently sampled value x(t) smaller than 0 may be only temporarily within the range below zero point, and the currently sampled value x(t) is not sure to be transit from the quasi bit 1 to the quasi bit 0. Thus, before the sampling at all the sampling points has been completed, the flow returns to step S206 to read the value of the next sampling point (C=C+1), and the determination of step S208 must be performed.

Figure 4E:
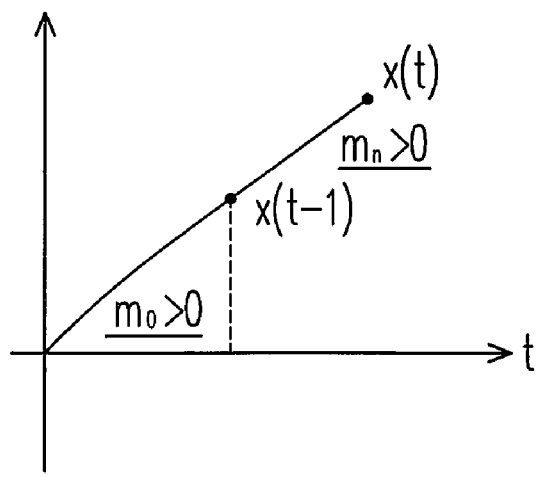

Type 3 will be discussed below. Referring to FIG. 4E, in the type 3 determined in step S230, the currently sampled value x(t) is greater than the previously sampled value x(t−1), and $m_o$ and $m_n$ are both greater than 0, i.e., the sampled values are in an increasing state. In this situation, step S232 is performed, so as to read the sampled value of the next sampling point, and determine the maximum value.

In summary, $x_{max}(i)$ can be calculated according to the steps shown in FIG. 4A. Referring to the definition of $x_{pp}$, a minimum value among the obtained $x_{max}(i)$ of the quasi bits 1, i.e., the critical value $x_{pp}$, can be obtained. The critical value $x_{pp}$ can be used to accurately determine whether the quasi bits 1 are the bits 1 or not.

In addition, as for the bits 0, in order to calculate the critical value $x_{np}$, appropriate modifications to the conditions can be made according to the flow chart of FIG. 4A and the waveform combination forms of the bits 0. Another method to obtain the critical value $x_{np}$ is to obtain the absolute values of the signals x(t) (i.e., |x(t)|) that forms the bits 0. At this time, the behaviors of the sampling points of the quasi points 0 are the same as the behaviors of the quasi bits 1. That is, $x_{max}(i)$ can be obtained according to the flow chart of FIG. 4A. Then, at this time, assuming $x_{max}(i)=-x_{max}(i)$, the minimum values (peak values) of the quasi bits 0 can be obtained. After that, the critical value $x_{np}$ can be obtained according to the definition of the critical value $x_{np}$.

FIG. 5A is a schematic flow chart of determining whether the waveform is the bits 1. Then, the numbers of the bits 1 and the bits 0 are determined according to the critical values $x_{pp}$ and $x_{np}$ calculated with the above method. The method to determine the bits 1 is as shown in the flow chart of FIG. 5A, in which the type 1 and type 2 are the same as the definitions of FIG. 4B.

Figure 5B:
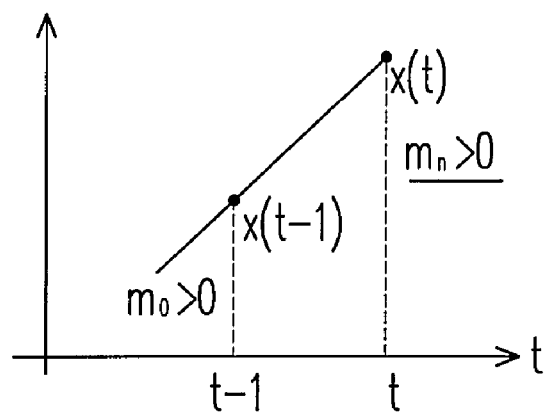
FIGS. 5B, 5C, 5D, and 5E are supplementary diagrams for illustrating FIG. 5A.

Firstly, in step S302, the sampled values x(t), x(t−1), x(t−2) . . . are read. At this time, the sampling points C=0, and the parameter s=0 (see the above description for the definitions of C and s). Then, in step S304, it is determined whether the currently sampled value x(t) is greater than the previously sampled value x(t−1), and whether both sampled values are greater than 0. Moreover, it is also determined whether $m_o$ and $m_n$ are both greater than 0, and are not the same. If the conditions of step S304 are satisfied, as shown in FIG. 5B, it is indicated that the sampled values are increased. Therefore, step S306 is performed to read the sampled value of the next sampling point.

Figure 5C:
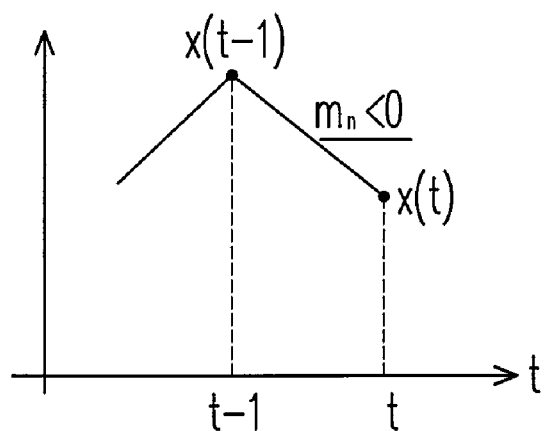

If the conditions of step S304 are not satisfied, i.e., the current value x(t) is smaller than the previously sampled value x(t−1) and $m_n$ is smaller than 0, or in other words, as shown in FIG. 5C, the sampled values are decreased. At this time, it is indicated that the sampled value x(t−1) may be a high point. Then, in step S308, it is determined whether the number C of the sampling points is greater than half of the predetermined number of the sampling points (i.e., C>T/2), and whether the sampled value x(t−1) is greater than the critical value $x_{pp}$. If the conditions are not satisfied, then step S306 is performed to read the sampled value of the next sampling point.

On the contrary, if the conditions of step S308 are satisfied, the parameter s is set to be 1 (step S310), and then the sampled value of the next sampling point is read (step S312). After the next sampled value is read in step S312, three possible situations may occur. The following illustration will be described with reference to FIGS. 5D and 5E.

Figure 5D:
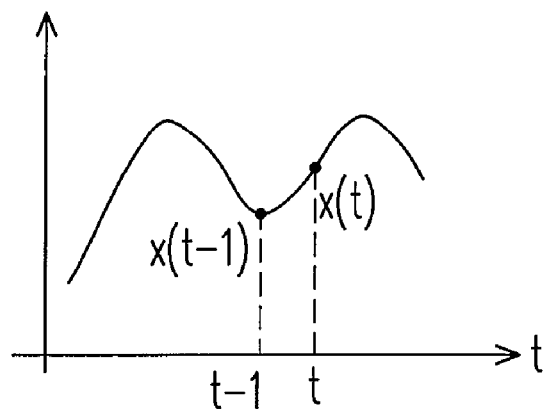

In step S320, it is determined that the newly read sampled value x(t) is greater than the previously sampled value x(t−1), $m_o$ is smaller than 0, and $m_n$ is greater than 0, as shown in FIG. 5D. If the conditions are satisfied, then in step S322, it is determined whether the number C of the sampling points is greater than the predetermined number T of the sampling points, and whether the previously sampled value x(t−1) is smaller than the critical value $x_{pp}$. This condition determines whether all of the sampled values of the quasi bit 1 have been read on one hand, and determines whether the sampled values are lower than the critical value on the other hand. If the conditions are satisfied, the quasi bit 1 is determined to be the bit 1, and the parameters s and C are reset to be 0 (step S324).

Figure 5E:
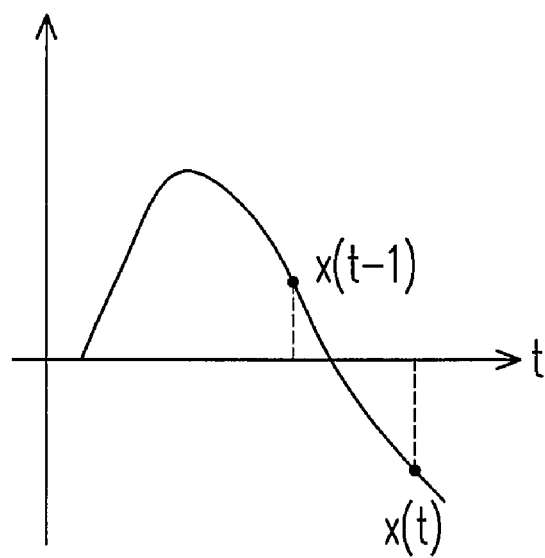

In step S330, it is determined whether the newly read sampled value x(t) is smaller than 0, whether the previously sampled value x(t−1) is greater than 0, and whether $m_o$ and $m_n$ are both smaller than 0, as shown in FIG. 5E. This type indicates that the sampled values have exceeded the zero point, and are in a decreasing trend. When this type is satisfied, it must be determined whether the sampled values really fall within the range below the zero point. In step S332, it is determined whether the number C of the sampling points is greater than the predetermined number T of the sampling points. According to this condition, it can be determined that whether all of the sampled values of the quasi bit 1 have been read. If the condition is satisfied, the quasi bit 1 is determined to be the bit 1, and the parameters s and C are reset to be 0 (step S334). Furthermore, if this condition is not satisfied, then return to step S312 to continue to read the next sampled value.

In step S330, it is determined that the currently sampled value x(t) is greater than the previously sampled value x(t−1), and $m_o$ and $m_n$ are both greater than 0, i.e., the sampled values are in an increasing state. In this situation, the flow returns to step S312 to read the sampled value of the next sampling point.

In summary, according to the process of FIG. 5A, it can be determined whether the signal is the bit 1. According to the result of the determination, the total number of the bits 1 in a unit time can be calculated. In addition, as for the bits 0, appropriate modifications can be made according to the concepts of FIG. 5A and the type variations of the bits 0, so as to obtain the total number of the bits 0 in the unit time.

Finally, assuming that the total number of the bits 1 and the bits 0 in a unit acquiring time is Q, then the bit rate in the unit time is the symbol rate, which is represented by $Q/T_S$. Thus, the symbol rate can be calculated according to different communication system architectures, so as to evaluate the performance of the communication systems. In addition, the transmission amount of a communication system can also be calculated according to the symbol rate.

The present invention uses simple mathematical operation to analyze relevant parameters of the signal waveform obtained during the measurement of the communication system. Finally, after a simple operation of the result of the signal analysis, the symbol rate of the communication system under test can be obtained. Thus, this method does not require complicated mathematical calculation and hardware structure to obtain the testing result of the symbol rate.

It will be apparent to persons of ordinary art in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A symbol rate testing method, comprising:
   receiving a signal with a plurality of quasi bits and sampling the signal within an acquiring time;
   calculating a sampled value of the signal at each sampling point;
   obtaining a critical value among the sampled values; and
   determining whether each of the quasi bits is a predetermined bit according to the critical value, and counting a number of the bits within the acquiring time to obtain a symbol rate,
   wherein the critical value among the sampled values is a minimum value among maximum values of all quasi bits 1, or a maximum value among minimum values of all quasi bits 0,
   when the quasi bit is a quasi bit 1, obtaining the maximum value of the quasi bit 1 further comprises:
   (a) reading a currently, a previously, and a second previously sampled values;
   (b) when the currently sampled value is greater than the previously sampled value, reading a next sampled value as a new currently sampled value; otherwise, setting the previously sampled value as a maximum value, and reading a next sampled value; and
   (c) when the next sampled value is smaller than the previously sampled value thereof, reading a next sampled value as a new currently sampled value; otherwise, performing the following determination:
   when the next sampled value is greater than the previously value thereof and the next sampled value is smaller than the maximum value, setting a maximum value of the quasi bit 1 as the maximum value; otherwise, reading a next sampling point;
   when the next sampled value is smaller than 0 and the previously sampled value thereof is greater than 0, setting a maximum value of the quasi bit 1 as the maximum value; otherwise, reading the next sampling point;
   when the next sampled value is greater than the previously sampled value thereof, reading the next sampling point.

2. The method as claimed in claim 1, wherein the predetermined bit is a bit 1 or a bit 0.

3. The method as claimed in claim 1, wherein each of the quasi bits has a predetermined number of the sampling points.

4. The method as claimed in claim 3, wherein the predetermined number of the sampling points is at least ten.

5. The method as claimed in claim 1, wherein the steps (b) and (c) further comprise determining whether the current number of the sampling points is enough according to whether the current number of the sampling points exceeds half of the predetermined number of the sampling points.

6. The method as claimed in claim 1, wherein determining whether each of the quasi bits 1 is the bit 1 further comprises:
   (a) reading a currently, a previously, and a second previously sampled values;
   (b) when the currently sampled value is greater than the previously sampled value, reading a next sampling point, and repeating the step (a);
   (c) when the condition of the step (b) is not satisfied, further determining whether a current number of the sampling points is enough, and whether the previously sampled value is greater than or equal to the critical value, wherein when the conditions are not satisfied, read a next sampling point, and repeat the step (a);
   (d) when the conditions of the step (c) are satisfied, further reading a next sampling point and performing the following determination:
   when the next sampled value is greater than the previously sampled value thereof and the previously sampled value thereof is smaller than the critical value, setting the quasi bit 1 to be the bit 1; otherwise, returning to the step (d);
   when the next sampled value is smaller than 0 and the previously sampled value thereof is greater than 0, setting the quasi bit 1 to be the bit 1; otherwise, returning to the step (d);
   when the next sampled value is greater than the previously sampled value thereof, and the second previously and the previously sampled values thereof and the next sampled value are in an ascending state, returning to the step (d).

7. The method as claimed in claim 6, wherein the steps (c) and (d) further respectively comprise determining whether the current number of the sampling points is enough according to whether the current number of the sampling points exceeds half of the predetermined number of the sampling points.

8. The method as claimed in claim 1, wherein when the quasi bit is a quasi bit 0, obtaining the minimum value of the quasi bit 0 further comprises:
   (a) reading a currently, a previously, and a second previously sampled values;
   (b) when the currently sampled value is smaller than the previously sampled value, reading a next sampled value as a new currently sampled value; otherwise, setting the currently sampled value as a minimum value, and reading a next sampled value; and
   (c) when the next sampled value is greater than the previously sampled value thereof, reading a next sampled value as a new currently sampled value; otherwise, performing the following determination:
   when the next sampled value is smaller than the previously value thereof and the next sampled value is greater than the minimum value, setting a minimum value of the quasi bit 0 as the minimum value; otherwise, reading a next sampling point;

when the next sampled value is greater than 0 and the previously sampled value thereof is smaller than 0, setting a minimum value of the quasi bit 0 as the minimum value; otherwise, reading the next sampling point;

when the next sampled value is smaller than the previously sampled value thereof, reading the next sampling point.

9. The method as claimed in claim 8, wherein the steps (b) and (c) further respectively comprise determining whether the current number of the sampling points is enough according to whether the current number of the sampling points exceeds half of the predetermined number of the sampling points.

10. The method as claimed in claim 8, wherein determining whether each of the quasi bits 0 is the bit 0 further comprises:
(a) reading a currently, a previously, and a second previously sampled values;
(b) when the currently sampled value is smaller than the previously sampled value, reading a next sampling point, and repeating the step (a);
(c) when the currently sampled value is greater than the previously sampled value and the previously sampled value is greater than or equal to the critical value, reading a next sampling point, and repeating the step (a);
(d) when the currently sampled value is greater than the previously sampled value and the previously sampled value is smaller than or equal to the critical value, reading a next sampling point, and performing the following determination:

when the next sampled value is smaller than the previously sampled value thereof and the previously sampled value thereof is smaller than the critical value, setting the quasi bit 0 to be the bit 0; otherwise, returning to the step (d);

when the next sampled value is greater than 0 and the previously sampled value thereof is smaller than 0, setting the quasi bit 0 to be the bit 0; otherwise, returning to the step (d);

when the next sampled value is smaller than the previously sampled value thereof, returning to the step (d).

11. The method as claimed in claim 10, wherein the steps (c) and (d) further respectively comprise determining whether the current number of the sampling points is enough according to whether the current number of the sampling points exceeds half of the predetermined number of the sampling points.

12. The method as claimed in claim 1, further comprising calculating a transmission amount according to the symbol rate.

* * * * *